(12) United States Patent
Shigeta et al.

(10) Patent No.: US 9,303,772 B2
(45) Date of Patent: Apr. 5, 2016

(54) DIAPHRAGM DEVICE AND PRESSURE REGULATING RESERVOIR USING THE SAME

(71) Applicants: ADVICS CO., LTD., Kariya-shi (JP); DENSO CORPORATION, Kariya-shi (JP)

(72) Inventors: Kazuma Shigeta, Kariya (JP); Kouji Aoba, Kariya (JP)

(73) Assignees: ADVICS CO., LTD., Kariya-Shi, Aichi-Ken (JP); DENSO CORPORATION, Kariya-Shi, Aichi-Ken (JP)

( * ) Notice: Subject to any disclaimer, the term of this patent is extended or adjusted under 35 U.S.C. 154(b) by 368 days.

(21) Appl. No.: 13/773,996

(22) Filed: Feb. 22, 2013

(65) Prior Publication Data

US 2013/0220461 A1    Aug. 29, 2013

(30) Foreign Application Priority Data

Feb. 24, 2012  (JP) ................................. 2012-039127

(51) Int. Cl.
*F16K 31/12* (2006.01)
*F16K 1/30* (2006.01)
*G05D 16/06* (2006.01)
*B60T 8/42* (2006.01)
*B60T 8/36* (2006.01)

(52) U.S. Cl.
CPC ................. *F16K 1/30* (2013.01); *B60T 8/4275* (2013.01); *F16K 1/307* (2013.01); *G05D 16/0663* (2013.01); *B60T 8/368* (2013.01); *Y10T 137/86485* (2015.04)

(58) Field of Classification Search
CPC .............. F16J 3/02; F16K 1/30; F16K 1/307; G05D 16/0663; B60T 8/4275; B60T 8/368; Y10T 137/86485
USPC ............. 137/596.17, 596.18, 505.26, 505.42; 251/331; 92/96; 303/113.2, 115.4, 303/114.1, 119.2
See application file for complete search history.

(56) References Cited

U.S. PATENT DOCUMENTS 3,978,880 A * 9/1976 Crown et al. ............ 137/315.05
7,347,509 B2 * 3/2008 Lenz .............................. 303/87

(Continued)

FOREIGN PATENT DOCUMENTS

DE      3706697 A1   9/1988
DE      4136108 A1   5/1993

(Continued)

OTHER PUBLICATIONS

Office Action (Notification of Reasons for Refusal) issued on Mar. 31, 2015, by the Japanese Patent Office in corresponding Japanese Patent Application No. 2012-039127, and an English Language Translation (6 pages).

(Continued)

*Primary Examiner* — Jessica Cahill
(74) *Attorney, Agent, or Firm* — Buchanan Ingersoll & Rooney PC

(57) ABSTRACT

A diaphragm device comprising: a supporting member; a flexible membrane that is supported by the supporting member; and a housing that accommodates the flexible membrane and the supporting member, and wherein the flexible membrane air-tightly separates a first chamber and a second chamber connected to the outside through a through-hole formed in a membrane supporting portion of the supporting member, inside the housing, wherein an avoidance recessed portion to avoid interference with an opening edge of the through-hole is formed at a position corresponding to the through-hole in the flexible membrane, wherein the avoidance recessed portion is provided at a thick portion thicker than the other portion of the flexible membrane, and the thick portion protrudes toward the first chamber.

4 Claims, 3 Drawing Sheets

(56) References Cited

U.S. PATENT DOCUMENTS

| | | |
|---|---|---|
| 2005/0061379 A1* | 3/2005 | Mori et al. ............... 138/31 |
| 2006/0091725 A1* | 5/2006 | Ariki et al. ............. 303/115.4 |
| 2006/0103233 A1 | 5/2006 | Lenz |
| 2010/0052417 A1 | 3/2010 | Aoba et al. |
| 2013/0014639 A1 | 1/2013 | Takeshita et al. |

FOREIGN PATENT DOCUMENTS

| | | |
|---|---|---|
| DE | 4213205 A | 10/1993 |
| JP | 2010-076747 A | 4/2010 |
| JP | 2011-027164 A | 2/2011 |
| JP | 2011-208675 A | 10/2011 |
| WO | WO 2011122424 A1 * | 10/2011 |

OTHER PUBLICATIONS

First Office Action dated Aug. 31, 2015 issued by the State Intellectual Property Office of People's Republic of China in the corresponding Chinese Patent Application No. 201310059003.8 and English translation (16 pages).

Office Action dated Feb. 3, 2016 issued by the German Patent Office in the corresponding German Patent Application No. 68668 and English translation (11 pages).

* cited by examiner

DIAPHRAGM DEVICE AND PRESSURE REGULATING RESERVOIR USING THE SAME

CROSS-REFERENCE TO RELATED APPLICATION

This application claims priority from Japanese Patent Application No. 2012-039127 filed on Feb. 24, 2012, the entire subject matter of which is incorporated herein by reference.

TECHNICAL FIELD

This disclosure relates to a diaphragm device, which uses a difference between pressures acting on both surfaces of a flexible membrane (hereinafter, referred to a difference pressure) to generate a driving force or which is used to balance the pressures of chambers where both surfaces of the flexible membrane face, and a pressure regulating reservoir using the diaphragm device. The pressure regulating reservoir achieves its effectiveness, specifically, in a case that brake fluid discharged from wheel cylinders are temporarily stored based on a command from an electronic control device in a brake device for a vehicle.

BACKGROUND

A conventional example of the diaphragm device has been disclosed in JP-A-2011-27164. Also, a pressure regulating reservoir using a diaphragm device has been disclosed in JP-A-2010-76747.

In the diaphragm device disclosed in JP-A-2011-27164, a protruding portion is provided at a center portion of the lower surface (surface positioned on the lower side during use) of a flexible membrane, and a region where the protruding portion exists becomes a thick portion thicker than the other portion, and a recessed portion is provided at the tip of the thick portion. The recessed portion corresponds to a through-hole formed in a component for supporting the flexible membrane (a through-hole connecting a chamber where one surface of the flexible membrane faces, to the outside), and it is provided for suppressing that the flexible membrane comes into contact with the opening edge of the through-hole and to be damaged.

Also, the pressure regulating reservoir of JP-A-2010-76747 is used for temporarily storing brake fluid discharged from wheel cylinders based on a pressure reduction command from an electronic control device in a brake device for a vehicle capable of performing ABS control (Anti-lock Brake System) or ESC (Electronic Skid Control). If a pump is driven by a motor serving as a driving source, the pressure regulating reservoir becomes a source of brake fluid to the pump.

This pressure regulating reservoir is a variable volume container and includes a piston, which is pressed by the discharged brake fluid such that the volume of a fluid storage chamber increases. Also, in order to continuously supply the brake fluid to the pump even after the fluid storage chamber becomes empty, a diaphragm device is disposed at a portion between the piston and the fluid storage chamber, so that, if the pump operates in a state where the fluid storage chamber is empty, a check valve is opened in the diaphragm device.

The intake of the pump is connected to a main reservoir of the brake device through the check valve. When it is possible to supply the brake fluid from the pressure regulating reservoir, the check valve is closed to disconnect the intake of the pump from the main reservoir, and when the pressure regulating reservoir is empty, the diaphragm device opens the check valve, thereby switching the source of brake fluid to the pump to the main reservoir.

In the diaphragm device provided to the pressure regulating reservoir of JP-A-2010-76747, an abutting member is made of a metal or the like to protect a portion of the flexible rubber membrane facing the opening edge of a through-hole. However, in this structure, the abutting member may collide with a supporting member, thereby generating abnormal noise or damaging the supporting member. Accordingly, the diaphragm device of JP-A-2011-27164 has been proposed.

SUMMARY

In the diaphragm device disclosed in JP-A-2011-27164, the protruding portion forming the thick portion is formed on the lower surface of the flexible membrane. For this reason, the recessed portion is formed in a supporting member for supporting the diaphragm device from below, and the protruding portion of the flexible membrane is fit into the recessed portion. However, in this structure, if the pressure of the fluid storage chamber of the pressure regulating reservoir becomes higher than atmospheric pressure, a pressure difference occurring between the fluid storage chamber and a chamber connected to the outside through an air hole (through-hole) may cause the thin portion around the base of the protruding portion of the flexible membrane to be bitten by the recessed portion of the supporting member, and there is a fear that the surface of the membrane will be torn or damaged.

This disclosure provides a diaphragm possible to eliminate that fear and improve the reliability of the diaphragm device and a pressure regulating reservoir using the diaphragm device.

In view of the above, a diaphragm device of this disclosure comprises: a supporting member; a flexible membrane that is supported by the supporting member; and a housing that accommodates the flexible membrane and the supporting member, and the flexible membrane air-tightly separates a first chamber and a second chamber connected to the outside through a through-hole formed in a membrane supporting portion of the supporting member, inside the housing. In the diaphragm device of this disclosure, an avoidance recessed portion to avoid interference with an opening edge of the through-hole is formed at a position corresponding to the through-hole in the flexible membrane, the avoidance recessed portion is provided at a thick portion thicker than the other portion of the flexible membrane, and the thick portion protrudes toward the first chamber.

The above-described diaphragm device may comprise a movable plate that is provided on an opposite side of the supporting member with respect to the membrane supporting portion side, and the movable plate is pressed by the flexible membrane. According to this diaphragm device, it is possible to use deformation of the flexible membrane to generate a driving force for operating a check valve or the like.

In the above-described diaphragm device, the movable plate may have a receiving recessed portion that accepts a protruded portion of the thick portion of the flexible membrane protruding toward the first chamber, wherein, under a situation where a thin portion around the protruded portion of the flexible membrane is in close contact with a membrane contact surface of the movable plate, a gap accepting escape of the flexible membrane according to its deformation may be formed between a surface of the receiving recessed portion of the movable plate and the protruded portion of the flexible membrane.

In the above-described diaphragm device, a center portion of the flexible membrane may be curved in a convex shape toward the second chamber, a membrane supporting surface of the membrane supporting portion of the supporting member may be curved in a concave shape corresponding to the curved portion of the center of the flexible membrane, and the avoidance recessed portion of the flexible membrane may be formed at the center of the curved portion of the flexible membrane.

The above-mentioned diaphragm device of this disclosure is used to configure a pressure regulating reservoir of this disclosure. The pressure regulating reservoir comprises: a flexible membrane that air-tightly divides an inside of a cylinder provided in a housing into a fluid storage chamber and an atmosphere chamber; and a piston that is inserted into the cylinder such that the piston is slidable and supports the flexible membrane from the atmosphere chamber side.

The piston has a through-hole connecting one surface side of the flexible membrane to the atmosphere chamber. In other words, in the pressure regulating reservoir of this disclosure, the piston for increasing or decreasing the volume of the fluid storage chamber is used even as the supporting member for supporting the flexible membrane of the diaphragm device, and the housing containing the cylinder is used even as the housing of the diaphragm device. Further, the flexible membrane has a thick portion thicker than the other portion, and an avoidance recessed portion to avoid interference with an opening edge of the through-hole is formed at a position of the thick portion of the flexible membrane corresponding to the through-hole, and the thick portion protrudes toward the fluid storage chamber.

In addition to the above-configuration, the pressure regulating reservoir comprises: a spring that biases the piston from the atmosphere chamber side toward the fluid storage chamber side; a movable plate that is accommodated in the fluid storage chamber such that the movable plate is provided on the end surface on the fluid storage chamber side of the flexible membrane; and a check valve that is disposed on a passage connecting the fluid storage chamber and a reservoir hole. When the pressure of the fluid storage chamber is negative, the flexible membrane expands toward the fluid storage chamber side so as to press the movable plate, and then a valve body of the check valve is lifted according to this displacement of the movable plate, so that the check valve is opened.

In the diaphragm device of this disclosure, interference with the through-hole formed in the membrane supporting portion of the supporting member is avoided by the avoidance recessed portion formed in the flexible membrane. Further, since the avoidance recessed portion is formed in the thick portion of the flexible membrane, thinning of the flexible membrane according to avoidance recessed portion formation is also avoided. Furthermore, since the thick portion is provided on the first chamber side, that is, on the opposite side to the membrane supporting portion side, it is unnecessary to form a recessed portion in the supporting member, and scratches according to the recessed portion or a hole edge and damages according to biting of the hole edge or the like are suppressed.

Also, the diaphragm device including the movable plate uses deformation of the flexible membrane to displace the movable plate, thereby capable of generating a driving force for operating a check valve or the like.

Also, the recessed portion for receiving the protruded portion of the flexible membrane is formed in the movable plate such that a gap accepting escape of the flexible membrane according to its deformation is formed between the surface of the recessed portion and the protruded portion of the flexible membrane, and when the flexible membrane is compressed due to a pressure difference occurring between the first chamber and the second chamber, the gap functions as a clearance. Therefore, the flexible membrane is suppressed by an excessive compression, and thus it becomes difficult for fatigue (so-called settling) of the flexible membrane to occur. Further, deformation of the recessed portion according to the compression is also suppressed, and thus it becomes difficult for interference with the through-hole to occur.

Also, since a center portion of the flexible membrane is curved convexly toward the second chamber side, as compared to a case of using a flat flexible membrane with no curved portion, extension of a rubber material when the movable plate moves by a predetermined amount is reduced and then a load on the membrane is reduced. Further, deformation responsibility of the flexible membrane to the pressure difference between the first chamber and the second chamber is superior.

The pressure regulating reservoir of this disclosure uses the above-described diaphragm so that the reliability is improved.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
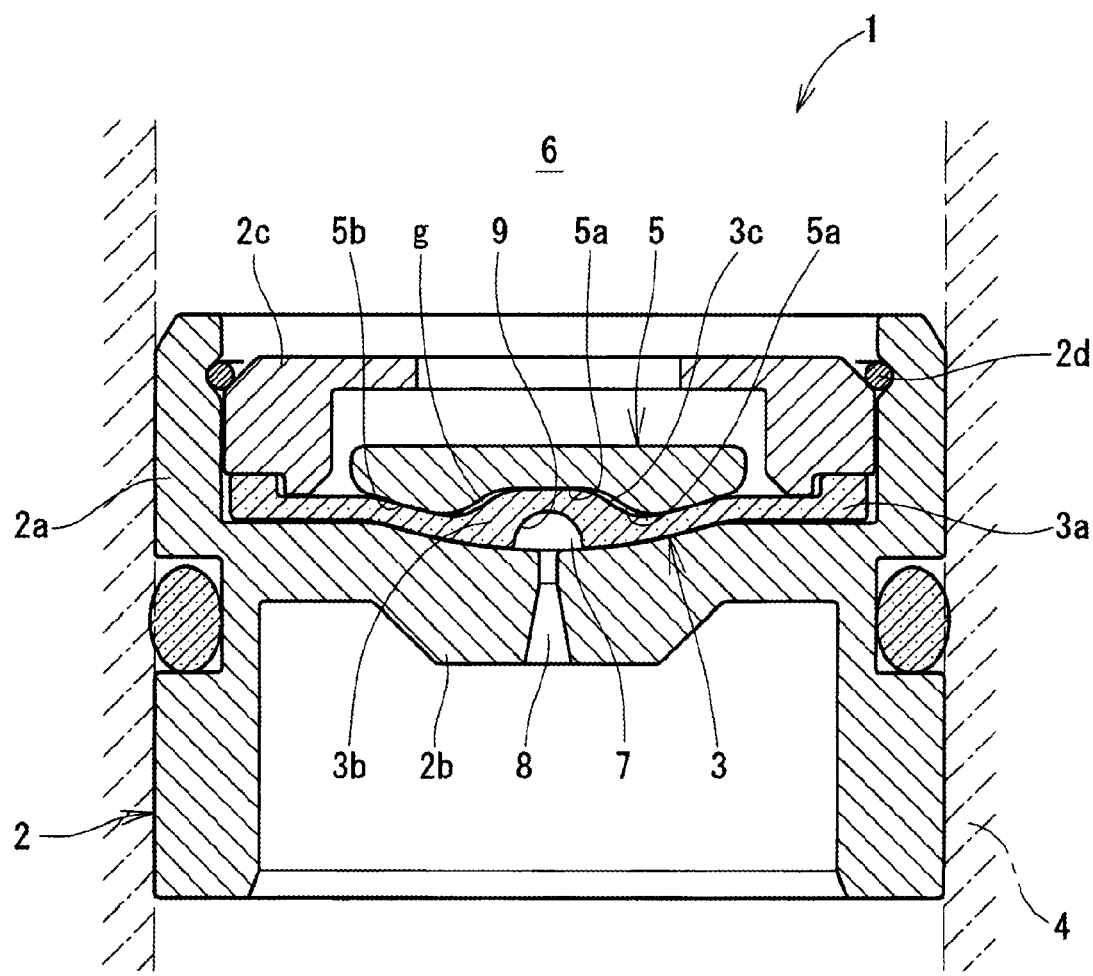
FIG. 1 is a cross-sectional view illustrating an example of a diaphragm device of this disclosure.

Hereinafter, embodiments of a diaphragm device and a pressure regulating reservoir using the diaphragm device according to this disclosure will be described with reference to the accompanying drawings, FIGS. 1 to 3. FIG. 1 illustrates an example of the diaphragm device of this disclosure. A diaphragm device 1 shown in FIG. 1 is configured by a supporting member 2, a flexible membrane 3 which is supported by the supporting member 2 (and is made of rubber in FIG. 1), a housing 4 which accommodates the flexible membrane 3 and the supporting member 2, and a movable plate 5 which is pressed by the flexible membrane 3.

The supporting member 2 shown in FIG. 1 includes a cylindrical portion 2a, a membrane supporting portion 2b which is integrally formed inside the cylindrical portion 2a and supports the flexible membrane 3 from below, an annular pressing member 2c which is inserted into the cylindrical portion 2a such that a mounting portion 3a of the outer circumference of the flexible membrane 3 is interposed between the pressing member 2c and the membrane supporting portion 2b, and a locked member 2d (which is a snap ring in FIG. 1) which is locked in an annular groove formed at the inner circumference of the cylindrical portion 2a to suppress the pressing member 2c from coming off from the cylindrical portion 2a. It is unnecessary to make a portion corresponding to the cylindrical portion 2a of the supporting member 2 and the membrane supporting portion 2b independent from the housing 4, and it is possible to form the portion corresponding to the cylindrical portion 2a of the supporting member 2 and the membrane supporting portion 2b integrally with the housing 4.

The flexible membrane 3 air-tightly separates a first chamber 6 and a second chamber 7, which are provided inside the housing 4. The upper surface of the flexible membrane 3 faces the first chamber 6. Also, the second chamber 7 which the lower surface of the flexible membrane 3 faces is connected to the outside through a through-hole 8 formed in the membrane supporting portion 2b of the supporting member such that the through-hole passes through the membrane supporting portion, and in the device shown in FIG. 1, the second chamber is always maintained at atmospheric pressure.

At the lower surface of a portion of the flexible membrane 3 corresponding to the through-hole 8, a recessed portion 9 is formed to avoid interference with the opening edge of the through-hole 8. The center portion of the flexible membrane 3 becomes a thick portion 3b thicker than the peripheral portion, and the recessed portion 9 is formed at the lower surface of the thick portion 3b. Also, the upper surface side of the thick portion 3b has a shape protruding toward the first chamber 6 such that a protruded portion 3c is formed.

The movable plate 5 is disposed on the upper surface of the flexible membrane 3. The movable plate 5 has a recessed portion 5a which receives the protruded portion 3c of the flexible membrane. The recessed portion 5a is formed such that under a situation where a thin portion of the flexible membrane around the protruded portion 3c is in close contact with a membrane contact surface 5b of the movable plate 5, a gap g accepting escape of the flexible membrane 3 according to its deformation is formed between the surface of the recessed portion 5a and the protruded portion 3c.

The center portion of the lower surface of the flexible membrane 3 and the membrane contact surface 5b of the movable plate 5 are curved in a convex shape toward the membrane supporting portion 2b of the supporting member 2, and the recessed portion 9 is formed at the center portion of the curved portion of the flexible membrane 3.

Also, in a case of using the diaphragm device shown in FIG. 1 for deforming the flexible membrane 3 to balance the pressures of the first chamber 6 and the second chamber 7 if a difference between pressures of fluid introduced to the first chamber 6 and the second chamber 7 occurs, the movable plate 5 is unnecessary.

Figure 2:
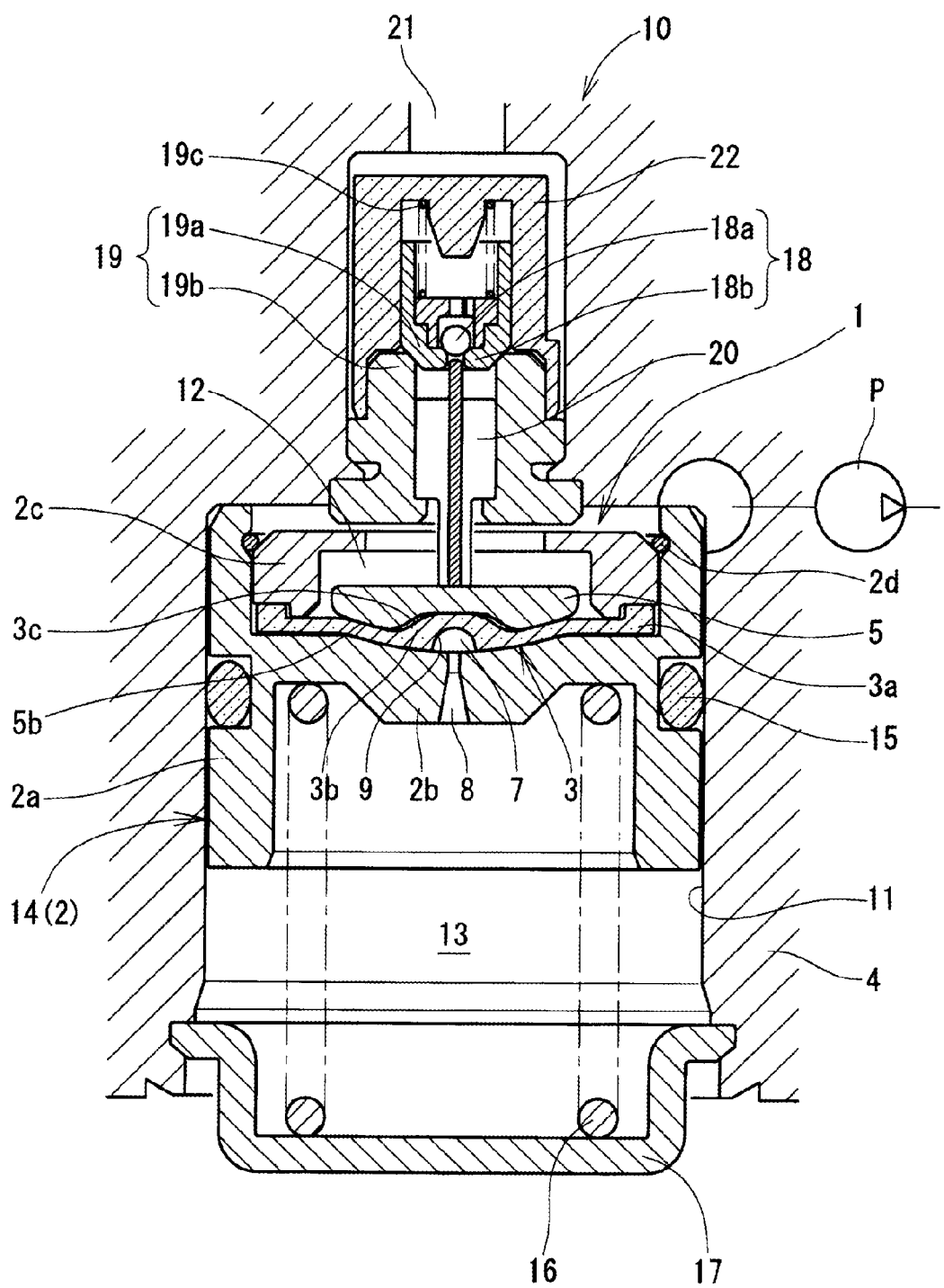
FIG. 2 is a cross-sectional view illustrating an example of a pressure regulating reservoir of this disclosure which is configured by using the diaphragm device of FIG. 1.
Figure 3:
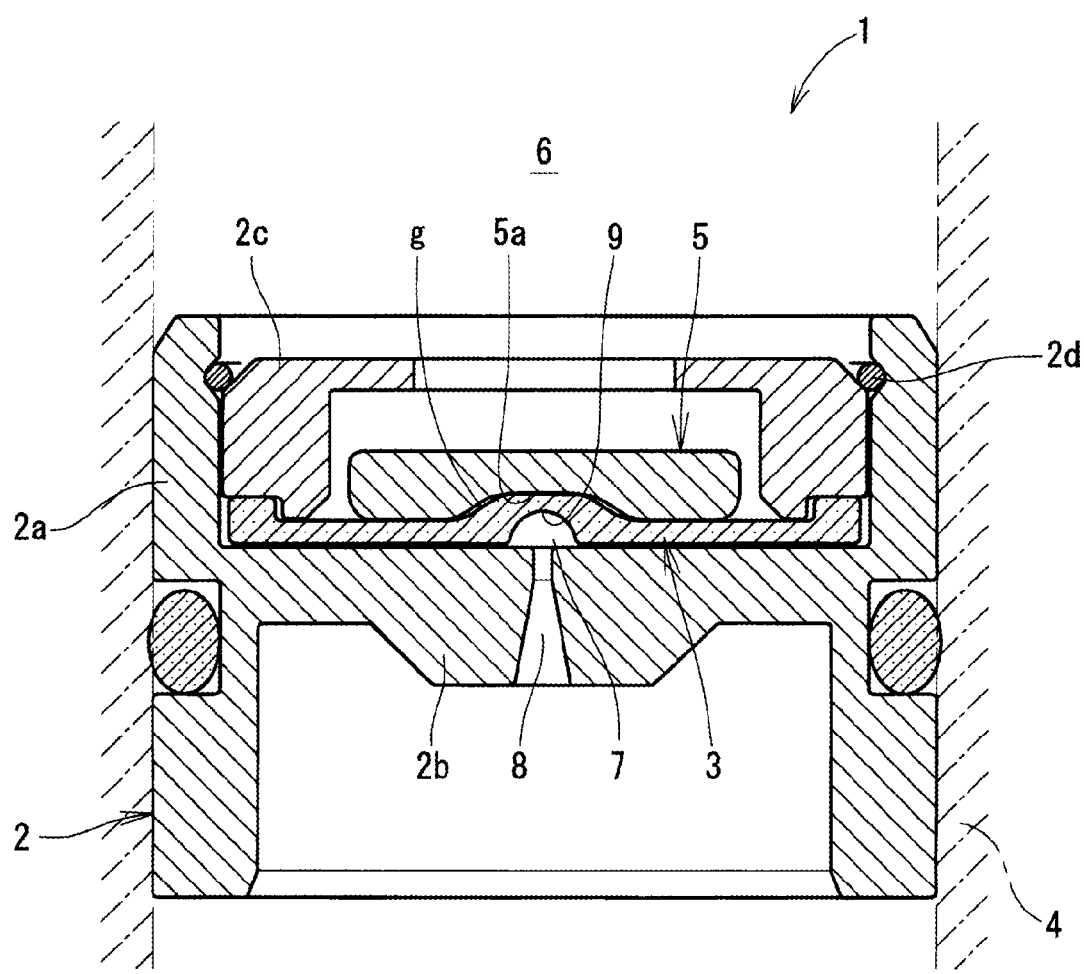
FIG. 3 is a cross-sectional view illustrating another example of the diaphragm device of this disclosure.

The above-mentioned diaphragm device 1 of this disclosure is used to configure a pressure regulating reservoir for a brake device of a vehicle, an example of which is shown in FIG. 2. A pressure regulating reservoir 10 shown in FIG. 2 is configured by assembling a piston 14 for separating a fluid storage chamber 12 and an atmosphere chamber 13 into a cylinder 11 provided in the housing 4 such that the piston 14 is slidable.

The piston 14 includes the flexible membrane 3 and the supporting member 2 including the cylindrical portion 2a, the membrane supporting portion 2b, the pressing member 2c, and the locked member 2d shown in FIG. 1, and the outer circumference of the cylindrical portion 2a is fluid-tightly sealed by an annular seal member (which is an O ring in FIG. 2) 15, so that the piston 14 is assembled inside the cylinder 11 such that the piston 14 is slidable.

The diaphragm device 1 including the movable plate 5 is provided. The housing 4 accommodating the cylinder 11 is used even as the housing of the diaphragm device 1, and the piston 14 is used even as the supporting member for supporting the flexible membrane of the diaphragm device 1. Also, the piston 14 has a through-hole 8 which connects one surface side of the flexible membrane 3 to the atmosphere chamber 13.

The pressure regulating reservoir 10 shown in FIG. 2 includes not only the above-mentioned components but also a spring 16 biasing the piston 14 toward fluid storage chamber 12, a spring receiver 17 also serving as a lid to be mounted on an inlet of the atmosphere chamber 13, a check valve 18 for a small-diameter oil passage, a check valve 19 for a large-diameter oil passage, a push-up pin 20, a reservoir hole 21, and a filter 22.

The check valve 18 is configured by combining a ball valve 18a and a valve seat 18b. Also, the check valve 19 is configured by combining a valve body 19a, a valve seat 19b which the valve body 19a comes into contact with or is separated from, and a spring 19c for biasing the valve body 19a in a valve opening direction.

In the pressure regulating reservoir 10 having the above-mentioned configuration shown in FIG. 2, the reservoir hole 21 is connected to a main reservoir (not shown) provided with a master cylinder of a brake device for a vehicle, and the fluid storage chamber 12 is connected to a discharge route (not shown) of brake fluid from wheel cylinders, and an intake of a pump P which is driven based on a command from an electronic control device (not shown).

The pressure regulating reservoir 10 temporarily stores the brake fluid discharged from the wheel cylinders of the vehicle, in the fluid storage chamber 12. Then, if the pump P is driven based on a command from the electronic control device, the pump pumps the brake fluid stored in the pressure regulating reservoir 10, and ejects the brake fluid.

Also, in the pump P being idle, if the pressure of the fluid storage chamber 12 is higher than the pressure of the reservoir hole 21, a pressure difference at that time causes the check valve 18 for the small-diameter oil passage to be opened, so that the pressure of the fluid storage chamber 12 is regulated. Further, if the pump P is driven in a state where the fluid storage chamber 12 is empty, the pressure of the fluid storage chamber 12 becomes negative, and a difference between the pressure of the fluid storage chamber 12 and the pressure of the atmosphere chamber 13 causes the flexible membrane 3 of the diaphragm device to expand upward.

As a result, the movable plate 5 is lifted up to raise the push-up pin 20, and the push-up pin 20 pushes up the valve body 19a of the check valve 19 for the large-diameter oil passage through the ball valve 18a. Therefore, the valve body 19a is separated from the valve seat 19b such that the large-diameter oil passage is opened, so that it becomes possible for the pump P to directly pump the brake fluid of the main reservoir of the brake device.

This operation has been disclosed in detail in JP-A-2010-76747. In other words, the pressure regulating reservoir of this disclosure is different from the pressure regulating reservoir of JP-A-2010-76747 in at least the flexible membrane 3 being improved.

Also, in the diaphragm device 1 of FIG. 1 and the diaphragm device provided in the pressure regulating reservoir of FIG. 2, the center portion of the flexible membrane 3 is curved in a convex shape toward the second chamber 7, the membrane supporting surface (upper surface) of the membrane supporting portion 2b of the supporting member 2 is curved in a concave shape corresponding to the curved portion of the center of the flexible membrane 3, and the recessed portion 9 of the flexible membrane 3 is formed at the center of the curved portion of the flexible membrane 3.

This is a preferable form (the reason has been already described). However, as shown in FIG. 3, the lower surface of the flexible membrane 3, and the upper surface of the membrane supporting portion 2b of the supporting member 2 for supporting the lower surface of the flexible membrane 3 may be formed to be flat.

What is claimed is:

1. A diaphragm device comprising:
a supporting member;
a flexible membrane that is supported at a first side thereof by a membrane supporting portion of the supporting member; and
a housing that accommodates the flexible membrane and the supporting member, and
wherein the flexible membrane air-tightly separates a first chamber and a second chamber connected to the outside through a through-hole formed in the membrane supporting portion of the supporting member, inside the housing,
wherein an avoidance recessed portion to avoid interference with an opening edge of the through-hole is formed at a position of the flexible membrane corresponding to the through-hole,
wherein the avoidance recessed portion is provided at a thick portion thicker than the other portion of the flexible membrane, and the thick portion protrudes from the other portion of the flexible membrane toward the first chamber,
wherein a movable plate is provided at a second side of the flexible membrane opposite the first side, the movable plate being pressed by the flexible membrane, wherein the supporting member is slidably accommodated in a cylinder provided in the housing,
wherein a spring is provided on the membrane supporting portion at a side opposite to the flexible membrane, and
wherein the flexible membrane and the supporting member are biased by the spring toward the first chamber.

2. The diaphragm device according to claim 1,
wherein the movable plate has a receiving recessed portion that accepts a protruded portion of the thick portion of the flexible membrane protruding toward the first chamber,
wherein, under a situation where a thin portion around the protruded portion of the flexible membrane is in close contact with a membrane contact surface of the movable plate, a gap configured to accommodate the flexible membrane according to its deformation is formed between a surface of the receiving recessed portion of the movable plate and the protruded portion of the flexible membrane.

3. The diaphragm device according to claim 1,
wherein a center portion of the flexible membrane is curved in a convex shape toward the second chamber,
wherein a membrane supporting surface of the membrane supporting portion of the supporting member is curved in a concave shape corresponding to the curved portion of the center of the flexible membrane, and
wherein the avoidance recessed portion of the flexible membrane is formed at the center of the curved portion of the flexible membrane.

4. A pressure regulating reservoir, comprising:
a flexible membrane that air-tightly divides an inside of a cylinder provided in a housing into a fluid storage chamber and an atmosphere chamber;
a piston that is inserted into the cylinder such that the piston is slidable and supports the flexible membrane from the atmosphere chamber side, and the piston having a through-hole connecting one surface side of the flexible membrane to the atmosphere chamber;
a spring that biases the flexible membrane and the piston from the atmosphere chamber side toward the fluid storage chamber side;
a movable plate that is accommodated in the fluid storage chamber such that the movable plate is provided on an end surface on the fluid storage chamber side of the flexible membrane; and
a check valve that is disposed on a passage connecting the fluid storage chamber and a reservoir hole,
wherein, when the pressure of the fluid storage chamber is negative, the flexible membrane expands toward the fluid storage chamber side so as to press the movable plate, and then a valve body of the check valve is lifted according to this displacement of the movable plate, so that the check valve is opened,
wherein the flexible membrane has a thick portion thicker than the other portion, and
wherein an avoidance recessed portion to avoid interference with an opening edge of the through-hole is formed at a position of the thick portion of the flexible membrane corresponding to the through-hole, and the thick portion protrudes from the other portion of the flexible membrane toward the fluid storage chamber while protruding away from the spring.

* * * * *